(12) United States Patent
Goulier

(10) Patent No.: US 11,824,599 B2
(45) Date of Patent: Nov. 21, 2023

(54) RETROMODULATION METHOD OF A CONTACTLESS COMMUNICATION, AND CORRESPONDING TRANSPONDER

(71) Applicant: STMICROELECTRONICS SA, Montrouge (FR)

(72) Inventor: Julien Goulier, Grenoble (FR)

(73) Assignee: STMICROELECTRONICS SA, Montrouge (FR)

( * ) Notice: Subject to any disclaimer, the term of this patent is extended or adjusted under 35 U.S.C. 154(b) by 96 days.

(21) Appl. No.: 17/457,561

(22) Filed: Dec. 3, 2021

(65) Prior Publication Data

US 2022/0200659 A1 Jun. 23, 2022

(30) Foreign Application Priority Data

Dec. 17, 2020 (FR) ...................................... 2013523

(51) Int. Cl.
*H04B 5/00* (2006.01)
*H04B 17/10* (2015.01)
*H04L 27/04* (2006.01)

(52) U.S. Cl.
CPC ......... *H04B 5/0031* (2013.01); *H04B 5/0012* (2013.01); *H04B 17/104* (2015.01); *H04L 27/04* (2013.01)

(58) Field of Classification Search
CPC .. H04B 5/0031; H04B 5/0012; H04B 17/104; H04B 5/0068; H04L 27/04
USPC ........................................................ 455/41.1
See application file for complete search history.

(56) References Cited

U.S. PATENT DOCUMENTS

| 2008/0018476 A1* | 1/2008 | Grasset .............. G06K 19/0707 340/572.7 |
|---|---|---|
| 2010/0013321 A1 | 1/2010 | Onishi et al. |
| 2014/0062588 A1 | 3/2014 | Gopalan et al. |
| 2014/0273828 A1 | 9/2014 | Yang et al. |
| 2019/0213459 A1 | 7/2019 | Kim et al. |

* cited by examiner

*Primary Examiner* — Eugene Yun
(74) *Attorney, Agent, or Firm* — Slater Matsil, LLP

(57) ABSTRACT

A contactless communication method comprises retromodulation of a carrier signal received at the terminals of an antenna in an alternation of modulated states and unmodulated states. The modulated state comprises a modulation of a load at the terminals of the antenna at zero impedance, and the transitions from the modulated state to the unmodulated state are controlled at an instant determined by a first delay.

20 Claims, 6 Drawing Sheets

RETROMODULATION METHOD OF A CONTACTLESS COMMUNICATION, AND CORRESPONDING TRANSPONDER

CROSS-REFERENCE TO RELATED APPLICATIONS

This application claims the benefit of French Patent Application No. 2013523, filed on Dec. 17, 2020, which application is hereby incorporated herein by reference.

TECHNICAL FIELD

Implementations and embodiments relate to contactless communications, in particular contactless communications using an amplitude retro-modulation of a carrier signal.

BACKGROUND

Contactless communications, such as communications according to the technology called "Near Field Communication", usually "NFC", and according to the technology called "Radio Frequency IDentification", usually "RFID", are wireless connectivity technologies which allow communication over a short distance, for example 10 cm, between electronic devices, such as for example between contactless integrated circuit cards or tags and readers.

NFC technology is an open technological platform, standardized in ISO-14443, EMVCo, NFC-forum standards but incorporates other already existing compatible communication standards. RFID technology is in particular standardized by the ISO-18092 standard and also incorporates other already existing compatible communication standards.

Contactless communications can be implemented between two contactless peer-to-peer communication devices (in particular devices compatible with NFC technology), such as multifunction telephones (usually referred to as "smartphone"); or else between a reader device and a transponder device, such as an NFC or RFID card or tag or a multifunction telephone emulated in card mode.

When transmitting information between a reader and a transponder, the reader generates a magnetic field with an antenna which is typically a sine wave (called the carrier, or carrier signal) at 13.56 MHz.

To transmit information from the reader to the transponder, the reader uses amplitude modulation of the carrier and the transponder is able to demodulate the received carrier to obtain the data transmitted by the reader.

To transmit information from the transponder to the reader, the reader generates the magnetic field (the carrier) without modulation. The transponder then modulates the field generated by the reader, according to the information to be transmitted. The frequency of this modulation corresponds to a subcarrier of said carrier. The frequency of this sub-carrier depends on the communication protocol used and may for example be equal to 848 kHz.

The modulation is performed by modifying the load connected to the terminals of the transponder antenna.

Two operating modes are then possible, a passive mode or an active mode.

In the active operating mode, the reader and the active transponder both generate an electromagnetic field. Generally, this operating mode is used when the active transponder has its own power source, for example a battery.

In particular, a passive transponder has no power supply and uses the energy transmitted by the carrier wave coming from the reader to power its integrated circuit.

In the passive mode, the transponder retro-modulates the wave coming from the reader to transmit information and does not integrate, for the transmission of information, an actual transmitter, capable for example of generating its own magnetic field during the emission.

The passive transponder modifies the impedance connected to its antenna to communicate data frames, by a retro-modulation visible on the side of the reader by inductive coupling.

During a frame transmission, the retro-modulation is defined either in an unmodulated state when the retro-modulation load is not connected to the antenna, or in a modulated state when the retro-modulation load is connected to the transponder antenna.

The greater the variation in impedance (that is to say the difference in load between the modulated state and the unmodulated state) generated by the transponder, the more it is visible from the reader side and it is therefore easier for the reader to demodulate the data. One of the main performance criteria for a transponder is the Load Modulation Amplitude "LMA". A method for measuring the LMA is to measure the difference in the amplitude of the current in the antenna Lc of the transponder CRD between the modulated state and the unmodulated state.

A difficulty encountered in the design of a contactless transponder is to optimize the LMA while maintaining a coherent frame, that is to say synchronized with the carrier signal of the reader, regardless of the conditions of the electromagnetic field (in particular the distance separating the reader and the transponder).

In conventional contactless transponders, load modulation is designed so that the carrier signal is available on the transponder antenna during both modulated and unmodulated states. This allows to keep in activity a clock extraction from the carrier, and to clock the transmission on the clock cycles of the extracted signal as the only time reference, in particular to define the transition instants between the unmodulated state and modulated state.

These conventional solutions have the disadvantage of prohibiting in principle zero or too low impedance at the terminals of the antenna, by the need to extract the clock signal. The conventional solutions consequently provide for adjusting the value of the impedance in the modulated state according to the effective level of the electromagnetic field, which complicates the design of the retro-modulation and limits the load modulation amplitude LMA.

There is a need to increase the load modulation amplitude LMA of contactless transponders, in particular passive contactless transponders.

SUMMARY

According to one aspect provision is made of a contactless communication method comprising a retro-modulation of a carrier signal received at the terminals of an antenna in an alternation of modulated states and unmodulated states. According to a general feature of this aspect, the unmodulated state comprises a modulation at a non-zero impedance of a load at the terminals of the antenna, the modulated state comprises a modulation at zero or almost zero impedance of the load at the terminals of the antenna, and the transitions from the modulated state to the unmodulated state are controlled at an instant determined by a first delay.

"Zero or almost zero impedance" means an impedance that is as low as possible taking into account the material constraints to implement it, for example it is considered that a transistor in the on state has zero or almost zero impedance at its conduction terminals. For example and in particular, "almost zero impedance" means an impedance which is at most of a few hundredths, for example 2%, of the value of the non-zero impedance of the unmodulated state.

In other words, full zero-impedance retro-modulation is provided in the modulated state with a use of a delay to maintain precise synchronization of the frame transmission. The first delay is thus used to define the time of the modulated state, since a clock signal cannot be extracted from the modulated carrier signal with a zero impedance.

Consequently, the load modulation amplitude LMA is maximized (strictly speaking, the modulated state component of LMA is optimized), which in particular allows to increase the range of contactless communication.

According to one implementation, the transitions from the unmodulated state to the modulated state are controlled at an instant determined by a duration measured over clock cycles resulting from a clock signal extracted from the carrier signal, the measurement of the duration starting from an instant determined by a second delay, the instant determined by the second delay being subsequent to the instant of the transition to the unmodulated state.

In other words, a second delay allows avoiding using the clock signal extracted when restarting the clock extraction at the start of the modulated state, allowing avoiding instabilities in the clock signal extracted when its generation restarts.

In particular, this allows the timing of the transmission to be very precisely defined over time, and also in a way that can adapt to different conditions.

According to one implementation, the measurement of the second delay and the measurement of the first delay start at instants coordinated with a modulation control signal initiating the control of the transition to the modulated state, the second delay being greater than the first delay.

For example, the modulation control signal is at the origin of the modulated state control, and can typically be generated by a digital controller. The starts of the measurements of the first delay and of the second delay are controlled from the modulation control signal, and are for example shifted from each other by a half clock cycle to ensure robust operation of the system.

The difference between the second delay and the first delay is advantageously designed to be just long enough to ensure that the clock signal extraction has restarted and is stabilized when the measurement over the clock cycles starts.

According to one implementation, a masking signal blocking the extracted clock signal at a constant reference level is generated for the duration of the second delay.

According to one implementation, the second delay is obtained by a time of loading a second capacitive element with a second reference current.

According to one implementation, the load modulation at the terminals of the antenna at zero or almost zero impedance of the modulated state is controlled by a retro-modulation signal generated for a duration determined by the first delay.

According to one implementation, the first delay is obtained by a time of loading a first capacitive element with a first reference current.

According to another aspect, provision is made of a contactless communication transponder, such as for example a tag, comprising an antenna intended to receive a carrier signal, and a modulator configured to retro-modulate the carrier signal in an alternation of modulated states and unmodulated states. According to a general feature of this aspect, the modulator comprises a first delay circuit configured to generate a first delay, and are configured to modulate a load at the terminals of the antenna to a non-zero impedance in the unmodulated state, to modulate the load at the terminals of the antenna to zero or almost zero impedance in the modulated state, and to control the transitions from the modulated state to the unmodulated state at an instant determined by the first delay.

According to one embodiment, the transponder further includes a clock extraction circuit configured to generate a clock signal extracted from the carrier signal, and the modulator comprises a second delay circuit configured to generate a second delay and a control circuit configured to measure a duration over clock cycles from the extracted clock signal from an instant determined by the second delay, the instant determined by the second delay being subsequent to the instant of the transition to the unmodulated state, and to generate a modulation control signal controlling the transitions from the unmodulated state to the modulated state at an instant determined by the measured duration.

According to one embodiment, the first delay circuit and the second delay circuit are configured to start the measurement of the first delay and the measurement of the second delay at instants coordinated with a modulation control signal generated by the digital controller for initiating the control of the transition to the modulated state, the second delay being greater than the first delay.

According to one embodiment, the second delay circuit is configured to generate a masking signal adapted to block the extracted clock signal at a constant reference level, for the duration of the second delay.

According to one embodiment, the second delay circuit includes a second capacitive element and a second current generator adapted to generate a second reference current, adapted to obtain the second delay by the time of loading the second capacitive element with the second reference current.

According to one embodiment, the first delay circuit is configured to generate a retro-modulation signal adapted to control the modulation of the load at the terminals of the antenna to zero or almost zero impedance in the modulated state, for the duration of the first delay.

According to one embodiment, the first delay circuit includes a first capacitive element and a first current generator adapted to generate a first reference current, configured to obtain the first delay by the time of loading the first capacitive element with the first reference current.

BRIEF DESCRIPTION OF THE DRAWINGS

Other advantages and features of the invention will become apparent upon examining the detailed description of embodiments and implementations, which are in no way limiting, and of the appended drawings, wherein.

DETAILED DESCRIPTION OF ILLUSTRATIVE EMBODIMENTS

Figure 1:
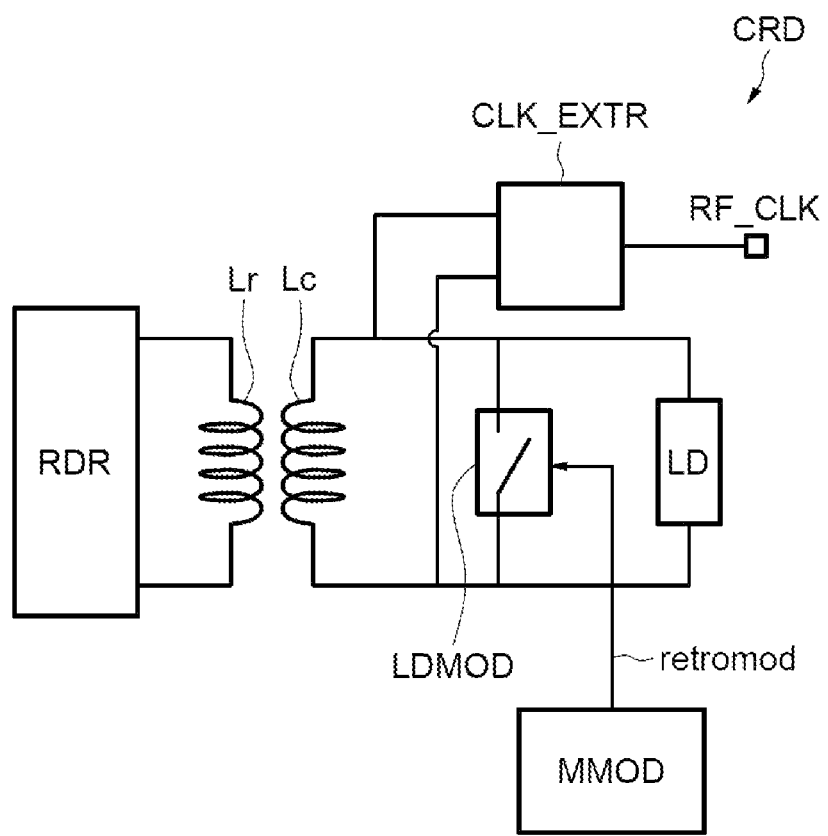
FIG. 1 shows a contactless communication system.

FIG. 1 shows a contactless communication system SYS, for example compatible with the near field communication technology "NFC" or with the radio frequency identification technology "RFID".

The system SYS includes a reader RDR and a passive transponder CRD, for example an integrated circuit card (such as a bank card) or a tag.

The reader includes an antenna Lr and a magnetic field generator containing the carrier signal, typically a sine wave at 13.56 MHz, on the antenna Lr.

The passive transponder CRD includes an antenna Lc intended to be inductively coupled with the antenna Lr of the reader RDR and an electronic circuit, for example produced in an integrated manner. The overall impedance of the electronic circuit of the transponder CRC on the terminals of the antenna Lc is represented by a load LD.

The term "passive" means in its usual meaning in the field of contactless communications, in particular of the NFC or RFID type, and more particularly means that the transponder is passive in that the reference clock signal that it uses to clock the contactless communication is exclusively based on the carrier signal supplied by the reader.

The transponder CRD includes in this regard a clock extraction circuit CLK_EXTR configured to generate a clock signal RF_CLK extracted from the carrier signal received at the terminals of its antenna Lc.

The transponder CRD includes modulator MMOD configured to amplitude retro-modulate the carrier signal in an alternation of modulated and unmodulated states. The modulator MMOD is configured to generate a retro-modulation signal controlling the coupling or not of a modulation load LDMOD to the terminals of the antenna Lc.

In the unmodulated state, the modulation load LDMOD is not coupled to the terminals of the antenna Lc and the impedance at the terminals of the antenna is defined by the (non-zero) impedance of the electrical circuit of the transponder CRD, called overall load LD. In the modulated state, the modulation load LDMOD is additionally coupled to the terminals of the antenna Lc, in parallel to the overall load LD, and the impedance at the terminals of the antenna is defined primarily by the impedance of the modulation load LDMOD.

The modulation load LDMOD has zero impedance and is represented by the diagram of a switch coupled to the terminals of the antenna Lc. However, the modulation load LDMOD can be performed by means of a transistor controlled by the retro-modulation signal, or optionally a resistive or capacitive circuit adapted to have a zero impedance.

Zero or almost zero impedance means a negligible impedance compared to the impedance of the overall load LD of the electrical circuit of the transponder CRD coupled to the antenna Lc, in particular the impedance considered at the frequency of the carrier signal. For example, it can be considered that the zero or almost zero impedance is limited to a maximum value of a few hundredths, for example 2%, of the non-zero impedance at the terminals of the antenna in the unmodulated state, that is to say a few hundredths of the overall load LD.

The overall load LD of the electronic circuit at the terminals of the antenna Lr includes the impedance of the clock extraction circuit CLK_EXTR and the modulator MMOD, as well as typical circuits such as a power supply manager of the limiting and rectifying circuit type (not shown).

FIGS. 2 to 6 illustrate an exemplary embodiment and implementation of the modulator MMOD.

Figure 2:
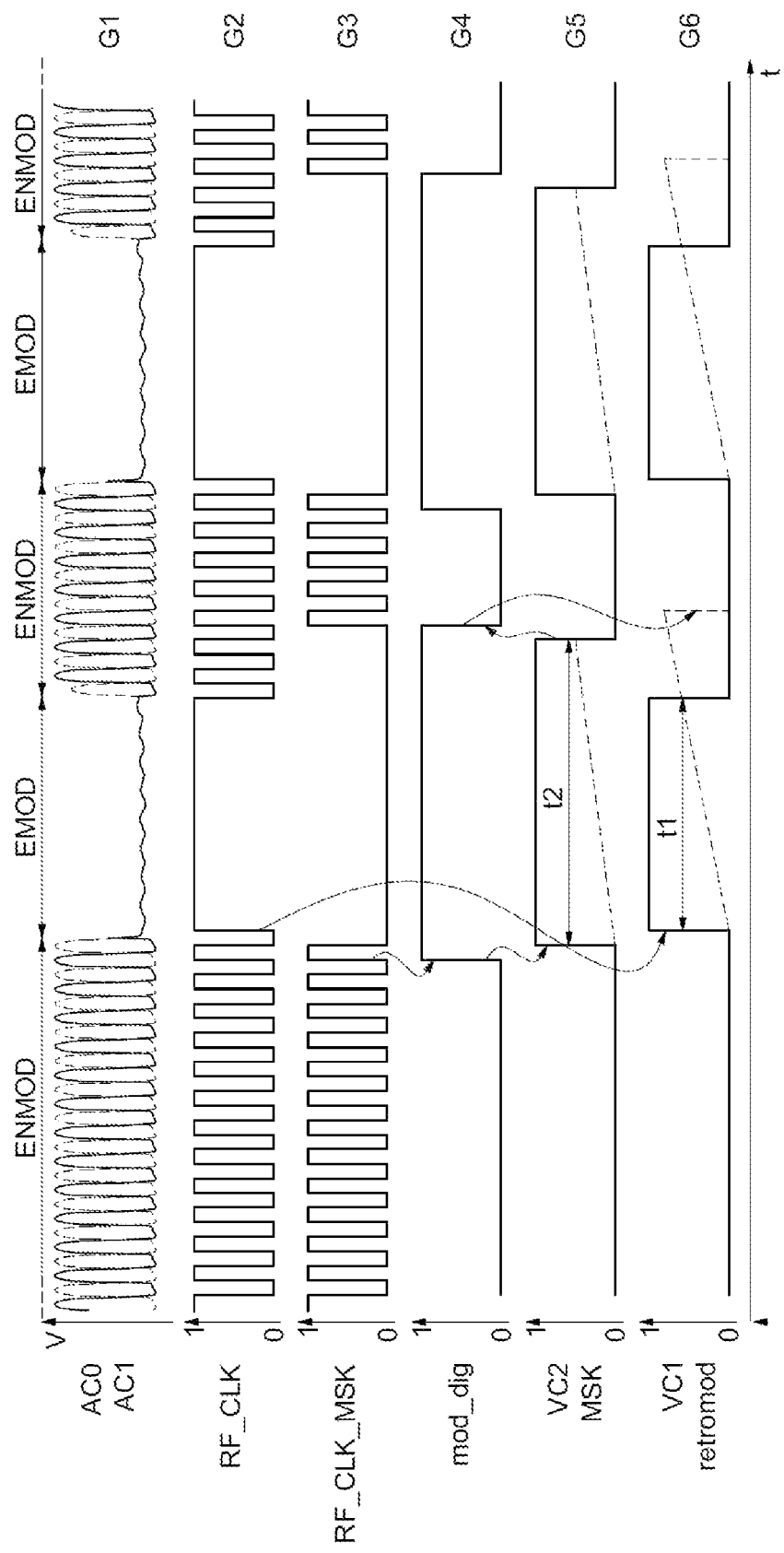
FIG. 2 illustrates timing diagrams for the transponder.

FIG. 2 illustrates timing diagrams G1-G6 of the main signals involved in the transponder CRD, in particular in the modulator MMOD, during a transmission of a data frame.

The diagram G1 shows the sinusoidal carrier signal coming from the reader RDR, in its two components AC0, AC1 on the two terminals of the antenna Lc of the transponder.

The diagram G2 shows the clock signal RF_CLK extracted from the carrier signal by the clock extraction circuit CLK_EXTR.

The diagram G3 shows a masked clock signal RF_CLK_MSK, described hereinafter in connection with FIGS. 5 and 6.

The diagram G4 shows a modulation control signal mod_dig, at the origin (before resynchronizations) of the transitions controls from the unmodulated state ENMOD to the modulated state EMOD.

The diagram G5 shows the generation of a masking signal MSK (in solid line), in particular by means of a second delay t2 generated by the load VC2 of a second capacitive circuit (in dashed line), as described hereinafter in relation to FIGS. 5 and 6.

Diagram G6 shows the generation of the retro-modulation signal retromod (in solid line), by means of a first delay t1 generated by the load VC1 of a first capacitive circuit (in dashed line), as described hereinafter in relation to FIGS. 3 and 4.

The transmission of the data frame is made by a burst of alternating modulated states EMOD and unmodulated states ENMOD, for example in Manchester-type coding.

A rising edge of the modulation control signal mod_dig controls a generation of the retro-modulation signal retromod to a high level "1".

The high level "1" retro-modulation signal controls the modulated state EMOD, that is to say, controls a modulation of the load LDMOD at the terminals of the antenna Lc to a zero impedance. The amplitude of the carrier signal AC0, AC1 is consequently reduced to a value substantially zero when the retro-modulation signal retromod is at "1", and the clock extraction circuit CLK_EXTR is no longer capable of detecting the periods of the carrier signal and the clock signal RF_CLK remains at a constant level.

The duration of the generation of the retro-modulation signal is determined by a first delay t1, obtained when the load VC1 of the first capacitive circuit MF1, C1 (FIG. 3) switches a CMOS inverter circuit (FIG. 3), that is to say exceeds half of the high level.

Switching the CMOS inverter circuit controls a falling edge of the retro-modulation signal retromod, to a low level "0", causing the transition from the modulated state EMOD to the unmodulated state ENMOD.

In the unmodulated state ENMOD, the load LDMOD at the terminals of the antenna Lc is no longer modulated to a zero impedance, the carrier signal AC0, AC1 has its initial amplitude and the extraction of the clock signal RF_CLK is resumed.

Figure 3:
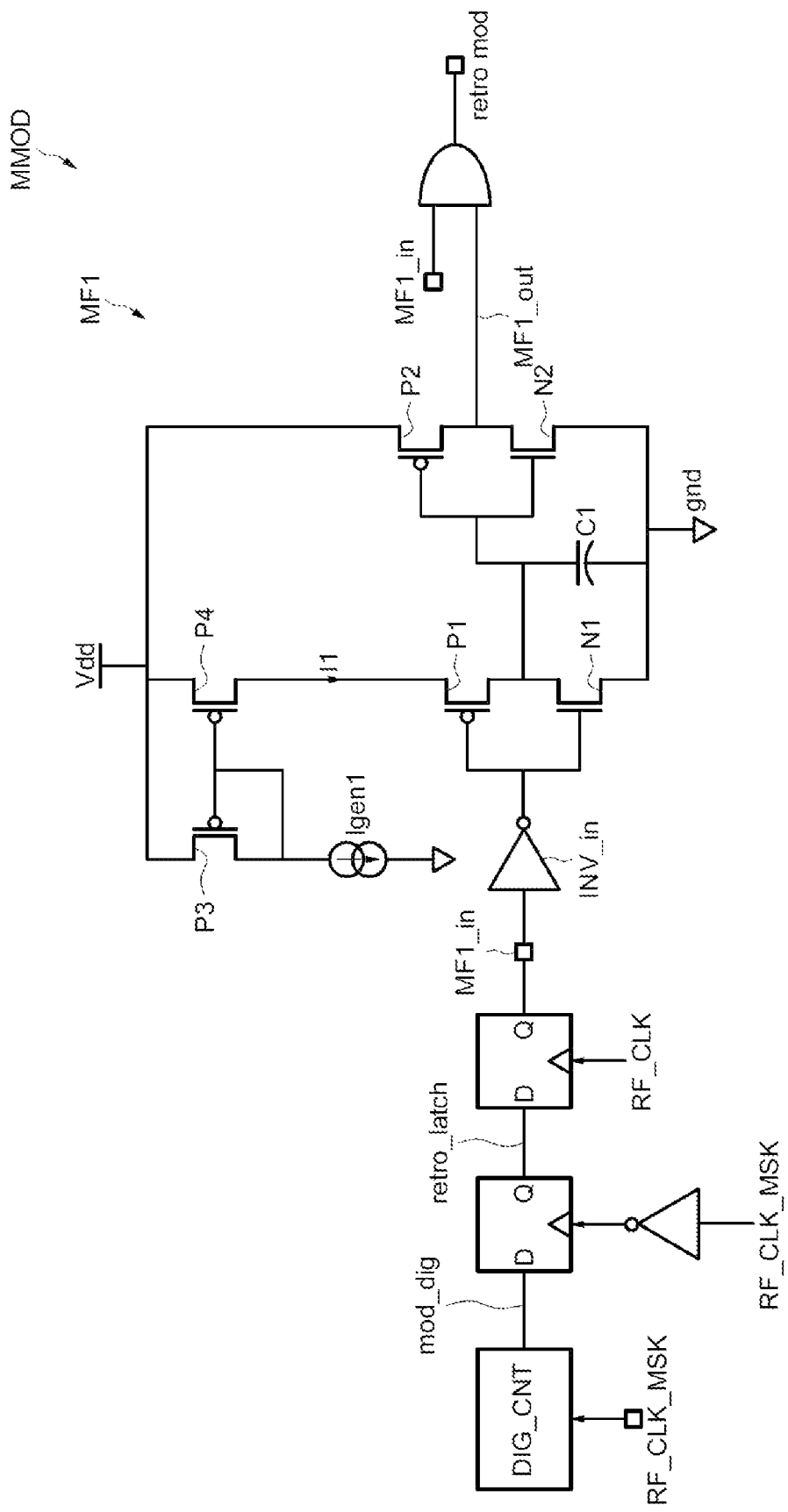
FIG. 3 shows a first delay circuit and a digital controller incorporated in the modulator.

Reference is made to FIG. 3.

FIG. 3 shows a first delay circuit MF1 and digital controller DIG_CNT generating the modulation control signal mod_dig, incorporated in the modulator MMOD.

The first delay circuit MF1 has in this example an architecture of the "monoflop" or "monostable latch" type, including a CMOS input inverter assembly P1-N1 whose output arrives at the input of a CMOS output inverter assembly P2-N2, power supplied by a high reference voltage Vdd and a low reference voltage gnd.

A first synchronized control signal MF1_in, derived from the modulation control signal mod_dig, is supplied to the input of the CMOS input inverter assembly P1-N1 by means of an inverter INV_in.

A capacitive element C1 is coupled between the output of the first CMOS inverter assembly P1-N1 and a terminal at the low reference voltage gnd.

A current source Igen1 imposes a first current I1, for example a maximum current, in the conduction terminal of the P-type transistor P1 of the CMOS input inverter assembly P1-N1, by means of a current mirror assembly P3-P4.

Consequently, when the control signal MF1_in is at a low level, the capacitive element C1 is short-circuited by transistor N1 in the on state, and the delay circuit MF1 directly transmits the high reference level Vdd on its output MF1_out. When the control signal MF1_in is at a high level, the capacitive element C1 is loaded by the current I1 via the transistor P1 in the on state, the voltage VC1 (FIG. 2, G6) at the input of the CMOS output inverter assembly P2-N2 has the shape of a rising slope and the delay circuit MF1 transmits the low reference level gnd on its output MF1_out with a delay of a duration t1 taken by the voltage VC1 to reach the threshold voltage of the transistor N2.

An AND gate between the control signal MF1_in and the output MF1_out of the first delay circuit MF1 allows to generate a clear falling edge on the modulation signal retromod at the switching instant defined by the delay t1.

Thus, the duration of the modulated state is precisely defined at an instant determined by the first delay t1 after receiving the modulation control signal mod_dig.

Indeed, the first synchronized control signal MF1_in is derived from the modulation control signal mod_dig, and in a simple exemplary embodiment, the modulation control signal mod_dig could directly control the input, on the inverter INV_in, of the delay circuit MF1.

However, in this exemplary embodiment, the first synchronized control signal MF1_in is derived from the modulation control signal mod_dig with, furthermore, a synchronization of its transitions on the falling edges of the masked clock signal RF_CLK_MSK and on the rising edges of the extracted clock signal RF_CLK, by means of respective flip-flops D.

The signal resulting from the synchronization of the modulation control signal mod_dig on the falling edges of the masked clock signal RF_CLK_MSK is called the second control signal (retro_latch), and is used to control a second delay circuit (MF2) described hereinafter in relation to FIGS. 5 and 6.

Thus, the first control signal MF1_in and the second control signal retro_latch are coordinated, from the modulation control signal mod_dig, so as to be shifted from each other. This allows ensuring robust operation of contactless communication, avoiding spurious effects in signal generation, of the clock cycle desynchronization type.

Figure 4:
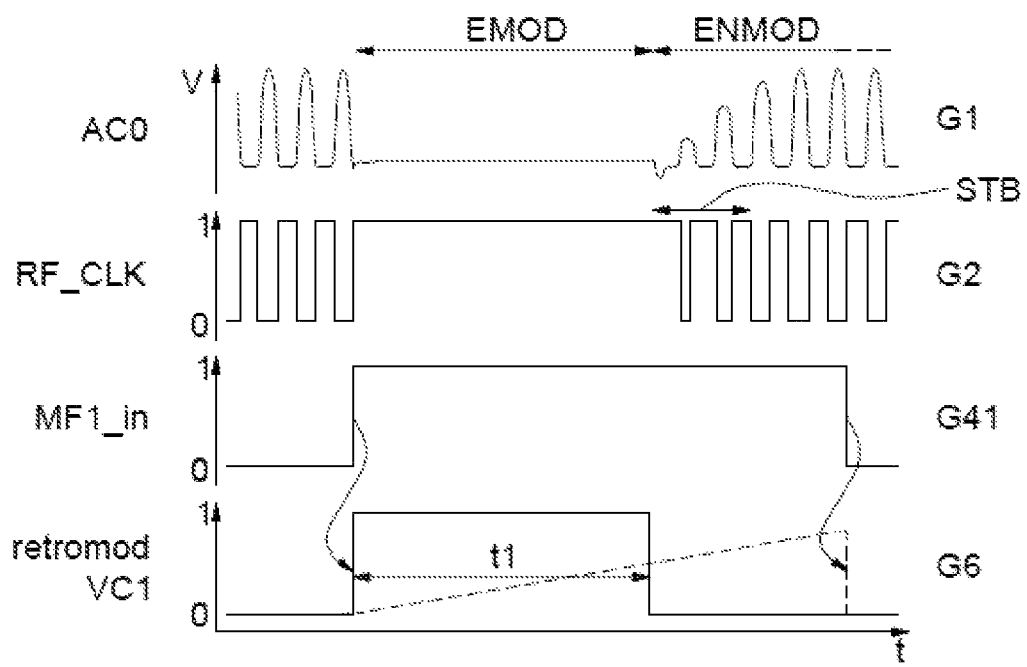
FIG. 4 shows a detail of some of the timing diagrams of FIG. 2.

FIG. 4 shows a detail of diagrams G1, G2, and G6 of FIG. 2, diagram G41 shows the synchronized control signal MF1_in.

Thus, it can be seen in FIG. 4 that the rising edge of the synchronized control signal MF1_in is synchronized with a rising edge of the clock signal RF_CLK, and directly produces the rising edge in the signal retromod, by the effect of the AND gate at the output of the first delay circuit MF1 (thus receiving the values MF1_in ="1" and MF1_out="1").

After the duration t1, when the voltage slope VC1 at the terminals of the capacitive element C1 switches the transistor P2, the AND gate generates the falling edge in the signal retromod (MF1_in ="1" and MF1_out="0").

The falling edge in the control signal MF1_in occurs after the falling edge of the retro-modulation signal retromod and directly switches the output of the first delay circuit MF1_out to "1", and the output of the AND gate remains at 0 (MF1_in ="0" and MF1_out="1").

The falling edge in the retro-modulation signal retromod marks the end of the modulated state EMOD, and the instant of transition from the modulated state to the unmodulated state ENMOD.

In summary, the modulator MMOD comprises a first delay circuit MF1 configured to generate a first delay t1 and the retro-modulation signal retromod. The retro-modulation signal retromod controls, on the one hand, the modulation of the load LDMOD at the terminals of the antenna Lc at zero impedance in the modulated state, and on the other hand, controls the transition from the modulated state EMOD to the unmodulated state ENMOD at an instant determined by the first delay t1.

At the start of the unmodulated state ENMOD, the carrier signal AC0, AC1 at the terminals of the antenna Lc of the transponder, may have a phase of instability wherein it needs a stabilization time STB to regain a level of sufficient amplitude to guarantee correct extraction of the signal RF_CLOCK, in particular depending on the nature of the overall load RD and on the distance between the reader RDR and the transponder CRD.

During the stabilization time, the extraction of the clock signal RF_CLK may be disturbed, which introduces a risk of error in the timing based on the extracted clock signal RF_CLK.

Figure 5:
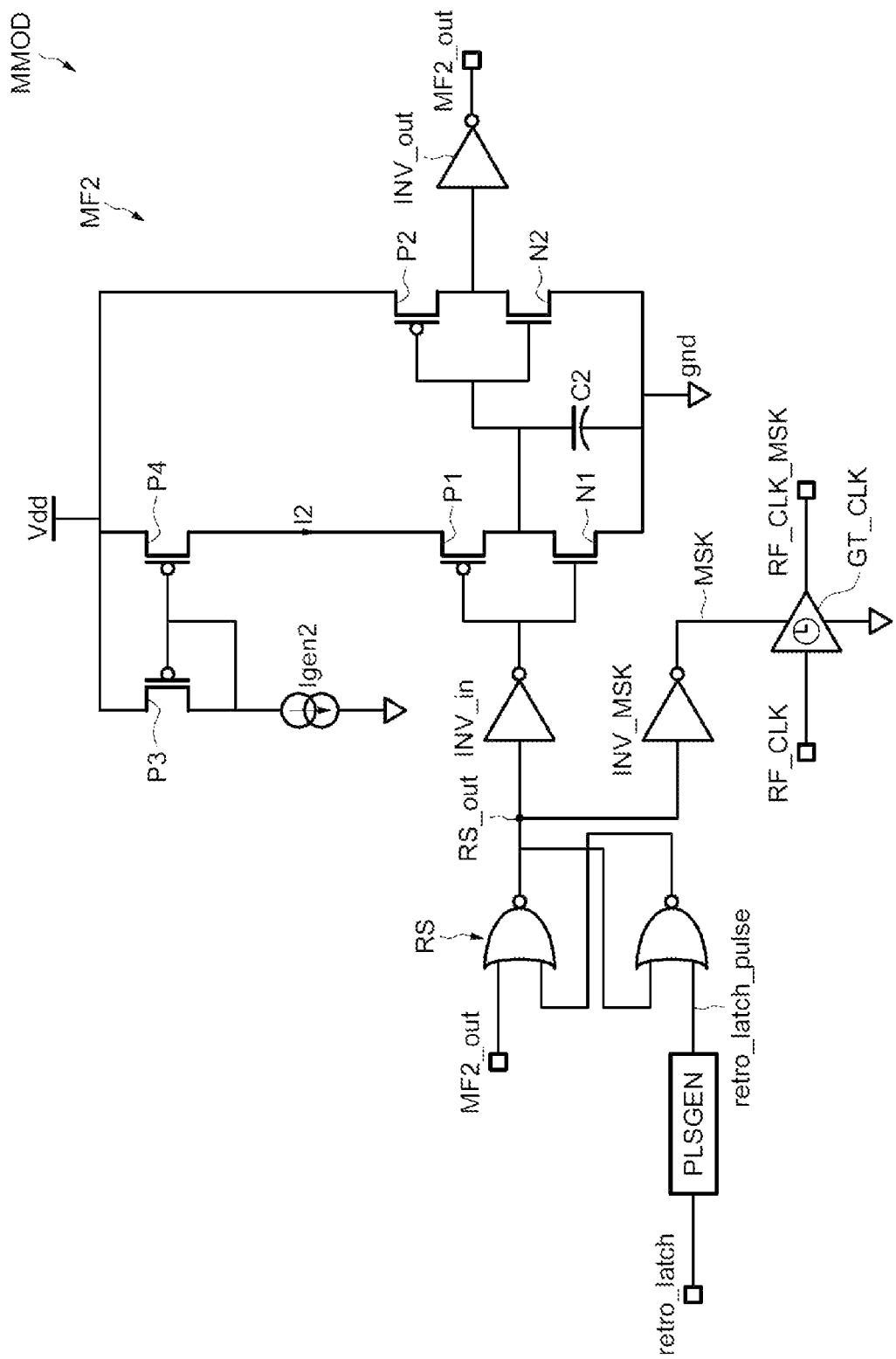
FIG. 5 shows a second delay circuit incorporated in the modulator.
Figure 6:
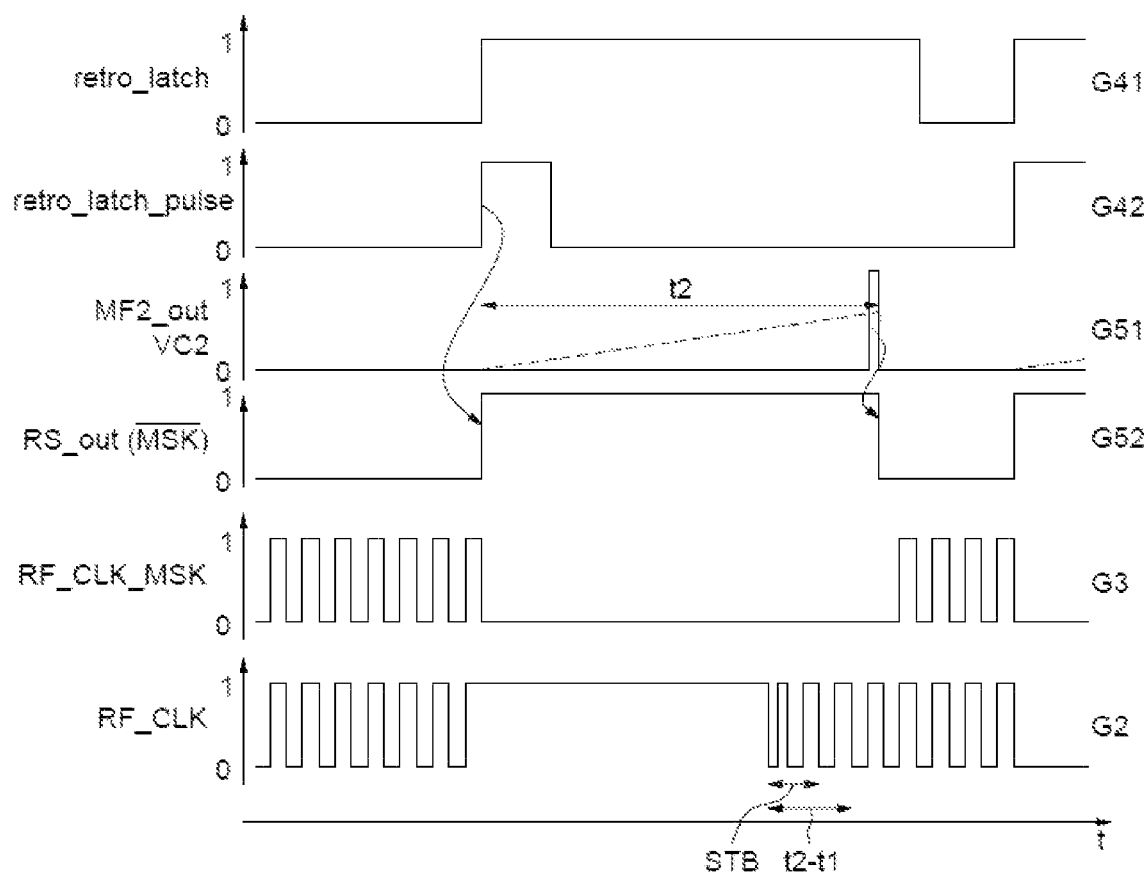
FIG. 6 shows a detail of some of the timing diagrams of FIG. 2.

Reference is made in this regard to FIGS. 5 and 6.

FIG. 5 shows a second delay circuit MF2 incorporated in the modulator MMOD and configured to generate a mask signal MSK masking the clock signal RF_CLK during the stabilization time STB.

Like the first delay circuit MF1, the second delay circuit MF2 has an architecture of the "monoflop" or "monostable latch" type. The common elements between the first delay circuit MF1 and the second delay circuit MF2 bear the same references and will not all be detailed again.

It will nevertheless be noted that, in the second delay circuit MF2, the current generator Igen2 generates a current I2 different from the current I1, and/or that the second capacitive element C2 has a capacitive value different from the first capacitive element C1.

The input of the second delay circuit MF2 is located at the input of the inverter INV_in, and the output signal MF2_out of the second delay circuit MF2 is provided by an inverter INV_out connected to the CMOS output inverter assembly P2-N2.

The signal controlling the second delay circuit MF2, supplied at the input of the inverter INV_in, is derived from the output RS_out of a NOR gate latch RS.

The initialization input ("set") of the latch RS receives a pulse retro_latch_pulse generated by a pulse generator PLSGEN on a rising edge of the modulation control signal mod_dig, or advantageously on a rising edge of the second synchronized control signal retro_latch in the framework of the exemplary embodiment described in relation to 2 to 6.

The reset input of the latch RS receives the output signal MF2_out from the second delay circuit MF2.

Furthermore, the output RS_out of the latch RS provides the masking signal MSK by means of an inverter INV_MSK. The masking signal controls a follower amplifier GT_CLK so that the follower amplifier retransmits the extracted clock signal RF_CLK on its output RF_CLK_MSK if the masking signal is at "1" (therefore if the signal on RS_out is at "0") and that it retransmits a constant signal at the low level "0" on its output RF_CLK_MSK if the masking signal is at "0" (therefore if the signal on RS_out is at "1").

In other words, the masking signal MSK is adapted to block the extracted clock signal RF_CLK_MSK at a constant reference level.

Reference is made to FIG. 6.

FIG. 6 shows a detail of diagrams G2 and G3 in FIG. 2, diagram G41 shows the second synchronized control signal retro_latch, diagram G42 shows the pulse retro_latch_pulse, the diagram G51 shows the output MF2_out of the second delay circuit MF2 (in solid line) and the voltage at the terminals of the second capacitive element C2 (in dashed lines), the diagram G52 shows the signal at the output RS_out of the latch RS.

Thus, with reference to FIGS. 5 and 6, when the modulation control signal (retro_latch) is at the high level "1", the pulse retro_latch_pulse initializes the output RS_out to "1". Using a pulse retro_latch_pulse instead of the signal retro_latch allows to avoid a conflict on the initialization and reset inputs of the latch RS.

On the one hand, the masking signal MSK is at "0" and the masked clock signal RF_CLK_MSK is blocked at "0", regardless of the behavior of the extracted clock signal RF_CLK.

On the other hand, the output RS_out at "1" controls the loading mechanism of the second capacitive element C2, according to a voltage slope VC2. The duration t2 that the voltage slope VC2 takes to reach half of the high level "1" is configured to be greater than the duration of the first delay t1.

After the second delay t2 has elapsed, the output MF2_out of the second delay circuit switches to "1" and resets the output RS_out of the latch RS to "0".

On the one hand, the output MF2_out of the delay circuit MF2 immediately switches to "0".

On the other hand, the masking signal MSK returns to "1" and the follower amplifier GT_CLK retransmits the clock signal RF_CLK on its output RF_CLK_MSK.

The difference between the first delay t1, which determines the instant of transition to the unmodulated state and the resumption of the extraction of the clock signal, and the second delay t2, which determines the end of the masking of the clock signal RF_CLK_MSK, is chosen so as to mask the extracted clock signal RF_CLK during the stabilization time STB.

The masked clock signal RF_CLK_MSK can thus be used without risk to clock the operations of the control circuit DIG_CNT (FIG. 4) after the second delay t2.

In particular, the control circuit DIG_CNT is configured to generate the modulation control signal mod_dig which controls the transition from the unmodulated state to the modulated state, at an instant defined by the measurement of a duration over the clock cycles of the masked clock signal RF_CLK_MSK.

Knowing the duration of the delays t1 and t2, the counting of the number of clock cycles is adapted to count the quantity remaining after the difference t2−t1.

In summary, the modulator MMOD advantageously comprises a second delay circuit MF2 configured to generate a second delay t2 starting at an instant coordinated with the start of the measurement of the first delay t1, from the modulation control signal mod_dig, at the origin of the control of the transition to the modulated state. The control circuit DIG_CNT is configured to measure the time remaining, after the second delay t2, of the unmodulated state on the clock cycles of the masked clock signal RF_CLK_MSK, derived from the extracted clock signal RF_CLK. The control circuit DIG_CNT can thus initiate the next control of the transitions from the unmodulated state to the modulated state by the modulation control signal mod_dig in a coherent and precisely synchronized manner with the carrier signal AC0, AC1, despite the loss of this signal in the modulated state.

Furthermore, given that the first delay t1 and the second delay t2 are defined by the intensities of the constant currents I1, I2 and by the capacitive values of the first capacitive element C1 and of the second capacitive element C2, embodiments and implementations can provide for a calibration of the delays t1, t2, according to the clock signal actually extracted.

For example, such a calibration can be done before the data transmission, for example when booting the transponder CRD or during the "emd" (for "electromagnetic disturbances") time provided before the transponder data transmission by the usual contactless communication standards, during which the transponder must have a constant impedance.

Adjustments of the intensities of the first current I1 and of the second current I2, as well as of the capacitive values of the first capacitive element C1 and of the second capacitive element C2, can allow easy and precise calibration of the durations of the first delay t1 and of the second delay t2.

The embodiments and implementations described above thus allow to use zero impedance in the modulated state TX to increase the performance of the transponder, and therefore increase the communication distance. This improvement is possible by a mechanism using delays compensating for the fact that the clock is not available in the modulated state. This ensures the coherence of the frame TX with the clock frequency of the carrier RF.

What is claimed is:

1. A contactless communication method comprising:
receiving a carrier signal at terminals of an antenna; and
retro-modulating the carrier signal in an alternation of a modulated state and an unmodulated state, the retro-modulating comprising:
modulating, in the unmodulated state, at a non-zero impedance a load at the terminals of the antenna;
modulating, in the modulated state, at zero or almost zero impedance the load at the terminals of the antenna;
controlling a transition from the modulated state to the unmodulated state at a first instant determined by a first delay; and
controlling a transition from the unmodulated state to the modulated state at a second instant determined by a duration measured over clock cycles resulting from a clock signal extracted from the carrier signal, the measurement of the duration starting from a third instant determined by a second delay, the third instant determined by the second delay being subsequent to the first instant of the transition to the unmodulated state.

2. The method according to claim 1, further comprising coordinating measurement of the second delay and measurement of the first delay start at respective instants with a modulation control signal initiating control of the transition to the modulated state, the second delay being greater than the first delay.

3. The method according to claim 1, further comprising generating a masking signal blocking the extracted clock signal at a constant reference level for the duration of the second delay.

4. The method according to claim 1, further comprising obtaining the second delay by a time of loading a second capacitive element with a second reference current.

5. The method according to claim 1, further comprising controlling the load modulation at the terminals of the antenna at the zero or almost zero impedance of the modulated state by a retro-modulation signal generated for a second duration determined by the first delay.

6. The method according to claim 1, further comprising obtaining the first delay by a time of loading a first capacitive element with a first reference current.

7. A contactless communication transponder comprising:
an antenna comprising terminals and configured to receive a carrier signal;
a clock extraction circuit configured to generate a clock signal extracted from the carrier signal; and
a modulator comprising:
a first delay circuit configured to generate a first delay,
a second delay circuit configured to generate a second delay, and
a control circuit,
wherein the modulator is configured to retro-modulate the carrier signal in an alternation of a modulated state and an unmodulated state, the retro-modulation comprising the modulator configured to:
modulate a load at the terminals of the antenna to a non-zero impedance in the unmodulated state,
modulate the load at the terminals of the antenna to zero or almost zero impedance in the modulated state, and
control a transition from the modulated state to the unmodulated state at a first instant determined by the first delay, and
wherein the control circuit is configured to:
measure a duration over clock cycles of the extracted clock signal from a third instant determined by the second delay, the third instant determined by the second delay being subsequent to the first instant of the transition to the unmodulated state, and
generate a modulation control signal controlling a transition from the unmodulated state to the modulated state at a second instant determined by the measured duration.

8. The contactless communication transponder according to claim 7, wherein the first delay circuit and the second delay circuit are configured to start measurement of the first delay and measurement of the second delay, respectively, at respective instants coordinated with the modulation control signal generated by the control circuit for controlling the transition to the modulated state, wherein the second delay is greater than the first delay.

9. The contactless communication transponder according to claim 7, wherein the second delay circuit is configured to generate a masking signal to block the extracted clock signal at a constant reference level, for the duration of the second delay.

10. The contactless communication transponder according to claim 7, wherein the second delay circuit comprises:
a second capacitive element; and
a second current generator configured to generate a second reference current;
wherein the second delay circuit is configured to obtain the second delay by a time of loading the second capacitive element with the second reference current.

11. The contactless communication transponder according to claim 7, wherein the first delay circuit is configured to generate a retro-modulation signal to control the modulation of the load at the terminals of the antenna to the zero or almost zero impedance in the modulated state, for a second duration of the first delay.

12. The contactless communication transponder according to claim 7, wherein the first delay circuit comprises:
a first capacitive element; and
a first current generator configured to generate a first reference current;
wherein the first delay circuit is configured to obtain the first delay by a time of loading the first capacitive element with the first reference current.

13. The contactless communication transponder according to claim 7, wherein the first delay circuit and the second delay circuit have a monostable latch type architecture.

14. The contactless communication transponder according to claim 13, wherein the monostable latch type architecture comprises a first complimentary metal-oxide semiconductor (CMOS) input inverter assembly having an output coupled to an input of a second CMOS input inverter assembly, wherein power supplied to the first and second CMOS input inverter assemblies is provided by a high reference voltage source.

15. A contactless communication transponder comprising:
an antenna comprising terminals and configured to receive a carrier signal;
a clock extraction circuit configured to generate a clock signal extracted from the carrier signal; and
a modulator configured to retro-modulate the carrier signal in an alternation of a modulated state and an unmodulated state, the modulator comprising:
a first delay circuit configured to generate a first delay,
a second delay circuit configured to generate a second delay; and
a control circuit configured to:
modulate a load at the terminals of the antenna to a non-zero impedance in the unmodulated state;
modulate the load at the terminals of the antenna to zero or almost zero impedance in the modulated state;
control a transition from the modulated state to the unmodulated state at a first instant determined by the first delay;
measure a duration over clock cycles of the extracted clock signal from a third instant determined by the second delay, the third instant determined by the second delay being subsequent to the first instant of the transition to the unmodulated state; and
generate a modulation control signal controlling a transition from the unmodulated state to the modulated state at a second instant determined by the measured duration.

16. The contactless communication transponder according to claim 15, wherein the first delay circuit is configured to generate a retro-modulation signal to control the modulation of the load at the terminals of the antenna to the zero or almost zero impedance in the modulated state, for a second duration of the first delay.

17. The contactless communication transponder according to claim 15, wherein the first delay circuit and the second delay circuit are configured to start measurement of the first delay and measurement of the second delay, respectively, at respective instants coordinated with the modulation control signal generated by the control circuit for controlling the transition to the modulated state, wherein the second delay is greater than the first delay.

18. The contactless communication transponder according to claim 15, wherein the second delay circuit is configured to generate a masking signal to block the extracted clock signal at a constant reference level, for the duration of the second delay.

19. The contactless communication transponder according to claim 15, wherein the second delay circuit comprises:
   a second capacitive element; and
   a second current generator configured to generate a second reference current;
   wherein the second delay circuit is configured to obtain the second delay by a time of loading the second capacitive element with the second reference current.

20. The contactless communication transponder according to claim 15, wherein the first delay circuit comprises:
   a first capacitive element; and
   a first current generator configured to generate a first reference current;
   wherein the first delay circuit is configured to obtain the first delay by a time of loading the first capacitive element with the first reference current.

* * * * *